P. VACA.
AUTOMOBILE DIRECTION SIGNAL.
APPLICATION FILED JUNE 9, 1917.
1,272,734.
Patented July 16, 1918.
2 SHEETS—SHEET 1.
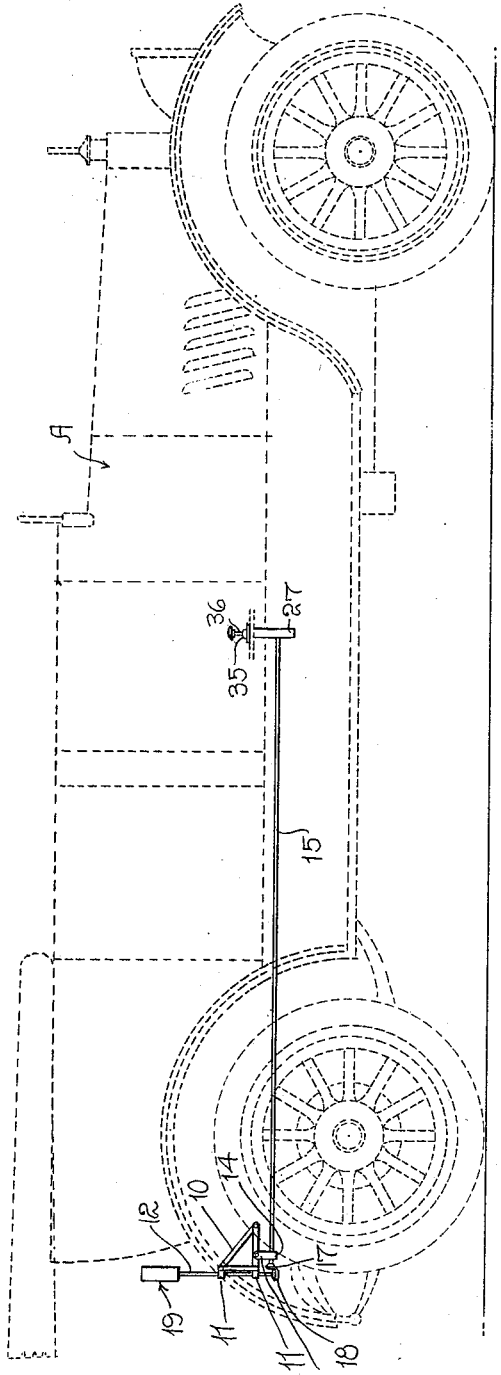
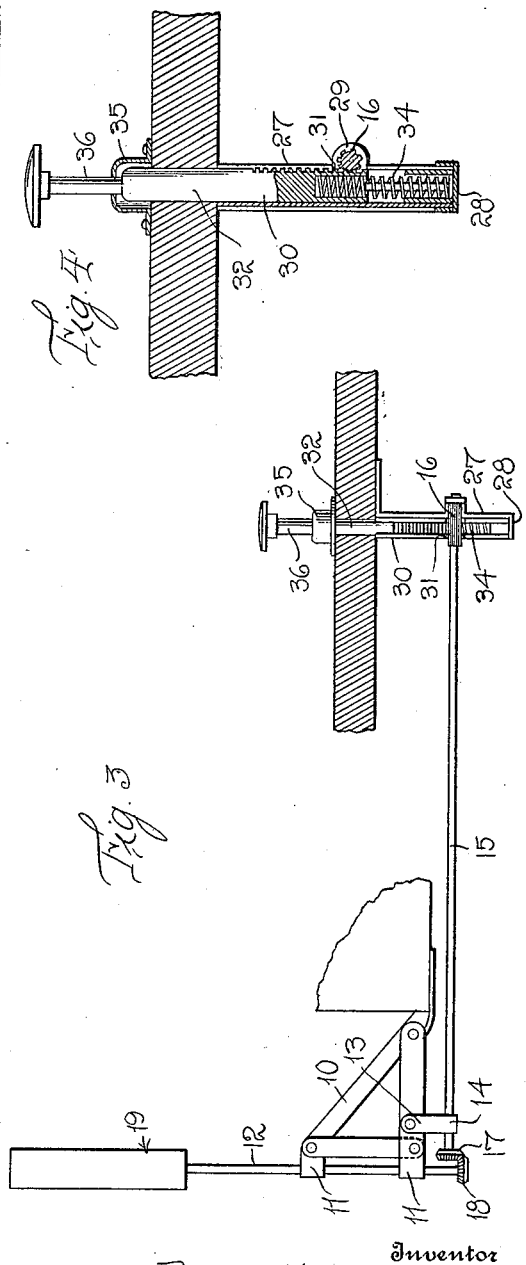
Inventor
PEDRO VACA
By Watson E. Coleman
Attorney P. VACA.
AUTOMOBILE DIRECTION SIGNAL.
APPLICATION FILED JUNE 9, 1917.
1,272,734.
Patented July 16, 1918.
2 SHEETS—SHEET 2.
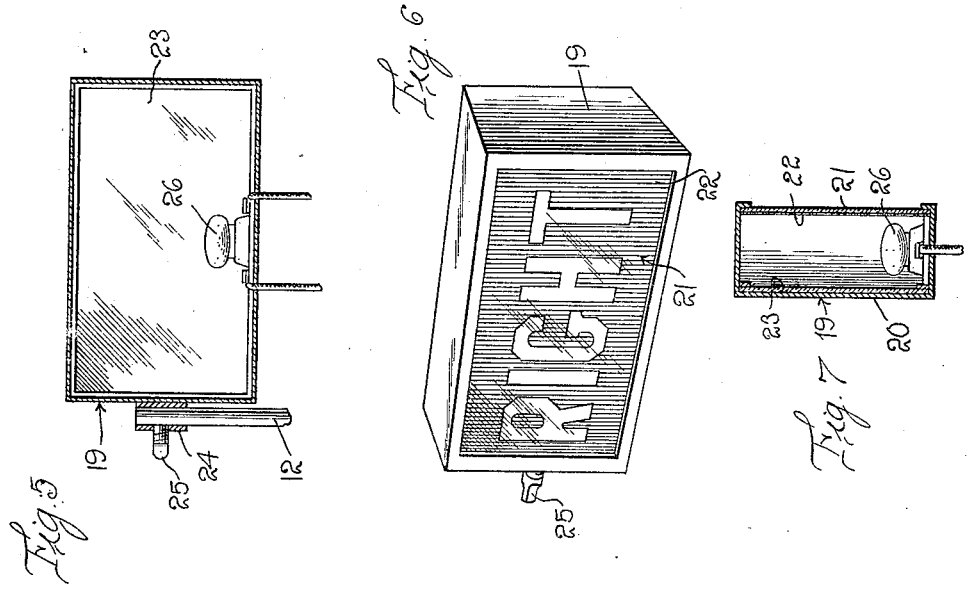
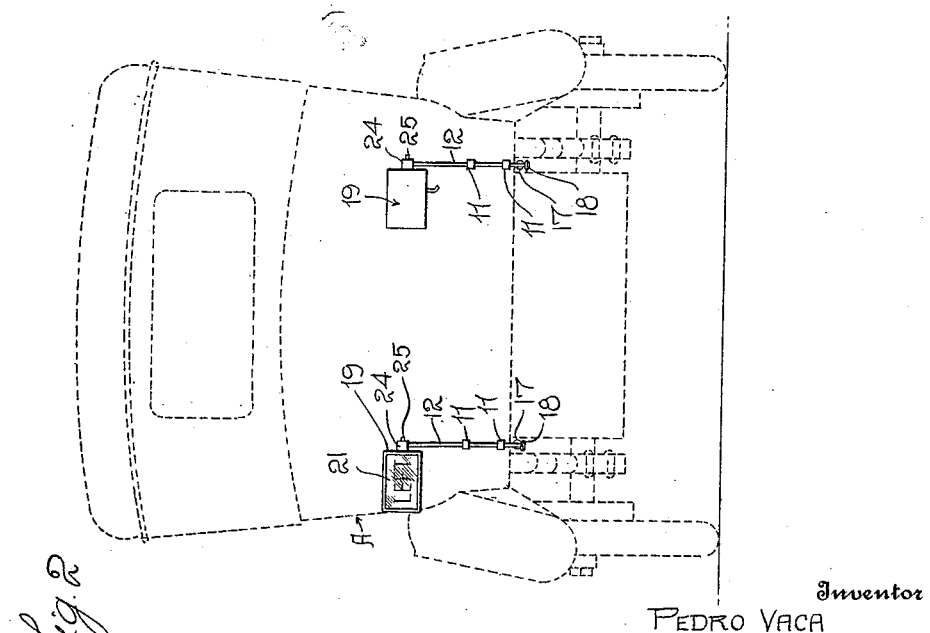
Inventor
PEDRO VACA
By Watson E. Coleman
Attorney

UNITED STATES PATENT OFFICE.

PEDRO VACA, OF SAN ANTONIO, TEXAS.

AUTOMOBILE DIRECTION-SIGNAL.

1,272,734.  Specification of Letters Patent.  Patented July 16, 1918.

Application filed June 9, 1917. Serial No. 173,847.

*To all whom it may concern:*

Be it known that I, PEDRO VACA, a citizen of the United States, residing at San Antonio, in the county of Bexar and State of Texas, have invented certain new and useful Improvements in Automobile Direction-Signals, of which the following is a specification, reference being had to the accompanying drawings.

This invention relates to automobile signaling devices, and particularly to direction signals including signals rotatably mounted upon the rear end of the automobile, and means adjacent the driver's seat whereby the signals may be actuated.

The general object of this invention is to provide a very simple and easily applied signal and actuating device therefor, whereby the fact that the vehicle is due to turn toward the right or toward the left may be readily indicated to a vehicle behind.

A further object is to provide improved means for turning the signal arms or lanterns to or from their display position, said means including plungers mounted upon the body of the automobile and adapted to be pressed by the feet of the driver.

A further object is to provide a construction of this kind in which the rear face of the signal is normally disposed in display position and provide means whereby the signal may be turned completely around so as to display the signaling face of the signaling member rearward.

Other objects will appear in the course of the following description.

My invention is illustrated in the accompanying drawings, wherein:—

Figure 1 is a side elevation of an automobile provided with my improved signal, the automobile being shown in dotted lines;

Fig. 2 is a rear end elevation of an automobile with my improved signals applied thereto;

Fig. 3 is a side elevation of the signaling mechanism, the floor of the automobile being in section;

Fig. 4 is a vertical sectional view of the actuating mechanism for one signal, the plunger being partly in elevation;

Fig. 5 is a vertical longitudinal sectional view through one of the signaling lanterns;

Figure 6 is a perspective view thereof; and

Fig. 7 is a transverse vertical sectional view thereof.

Referring to these drawings, A designates the body of an automobile of any suitable and ordinary construction. Mounted upon the rear end thereof are the triangular brackets 10. Each of these brackets is provided with vertically disposed bearings 11 at its rear end through which passes a vertical shaft 12. There are two of these brackets 10 mounted adjacent the sides of the automobile at the rear ends thereof, each of the shafts 12 being adapted to support a signal. Projecting downward from the lower horizontal element of the bracket 10 is a clip 13, providing a bearing 14 for the support of a longitudinally extending shaft 15. There is one of these shafts for each one of the brackets. These shafts extend forward and inward convergently and each shaft at its forward end is provided with teeth 16. The rear end of each shaft 15 carries a beveled gear wheel 17, which engages with the beveled gear wheel 18 on the corresponding shaft 12 and mounted on the upper end of each shaft 12 is a signaling member designated generally 19 and comprising a hollow somewhat oblong casing having a closed rear wall 20 and a front wall 21 composed of a pane of glass. Preferably this glass on its inner face is coated with red paint or like composition designated 22. This paint is omitted in places so as to form the words "Right" or "Left." Preferably the inner face of the rear wall 20 is provided with a reflector 23.

Mounted at one end of the casing 19 is a sleeve 24 having a set screw 25 and the corresponding shaft 12 is adapted to be inserted through the sleeve 24 and the casing 19 be held in position upon the shaft by means of the set screw 25. Disposed within the casing 19, which may be constructed in any suitable manner, is the lamp 26, which is preferably an electric light and preferably disposed below the painted margin of the glass wall 21 so that it cannot be directly seen. The light from these lamps, however, is reflected up against the rear wall and reflected back through the openings of the paint on the front wall by the reflecting surface left on the rear wall. The electrical connections to these lamps 26 may be of any suitable character and I have not indicated these electrical connections. Preferably, of course, the electrical connections will extend rearward along the casing 19 and then down the shaft 12, so that a rotation of the shaft 12 and of the casing 19 will not break or otherwise affect the electrical connections. Of course the lamps are connected in circuit with a suitable battery or other source of electricity and with a dash switch.

For the purpose of actuating the shafts 15, I provide for each shaft a vertically disposed hanger 27, which is attached to the under face of the bottom of the body and extends downward and is laterally bent or angled as at 28. This hanger at one point is cut away and a tongue of metal so formed is bent laterally and then forwardly as at 29 to form a bearing for the end of the shaft 15. Mounted upon each hanger 27 and resting upon the angular terminal end thereof is a casing 30, which is longitudinally slotted along its front wall, the middle of the side walls of this casing being cut away as at 31 for the passage of the shaft 15. Disposed within this casing 30 is a plunger 32 which extends up through the floor of the automobile and which is formed with teeth 33 engaging the teeth 16 on the corresponding shaft. The spring 34 urges the plunger upward, this spring being held in the lower portion of the casing 30 by any suitable means. The upper end of the plunger is reduced and is disposed within a cap 35, which is attached in any suitable manner to the floor of the automobile, this cap being hollow and perforated for the passage of the plunger. The plunger may be provided with any suitable pedal 36 whereby it may be operated.

As before stated there are two of these plungers disposed relatively adjacent each other and relatively adjacent the clutch pedals whereby the automobile is controlled. Normally the signaling members 19 are swung inward so that their rear walls are exposed upon the rear of the automobile. Now upon depressing one or the other of the plungers 32, the corresponding shaft 15 will be rotated to swing the corresponding member 19 around so as to expose its front face. The signaling member will swing around in the direction in which the automobile is to be turned and at the same time the word "Left" or "Right" will be displayed. During the day, of course, the signaling lamps are not lighted or energized, but the signaling member is entirely obvious. It is not only disposed on the left or right side of the automobile, but indicates, by its swinging movement, the direction of the automobile so that there is no danger of the signal being misconstrued. When the lamps are energized, of course, the direction on the glass of the signaling member may be readily observed.

While I have illustrated the preferred form of my construction, it will be understood, of course, that many changes may be made therein without departing from the spirit of the invention.

Having described my invention, what I claim is:—

A signaling mechanism for automobiles including a longitudinally extending operating shaft carrying gear teeth at one end, and means for rotating said shaft comprising a hanger attached to the floor of the automobile and having an angularly bent terminal end, said hanger being longitudinally slotted and formed with outwardly extending ears forming a bearing for the shaft, the toothed portion of the shaft crossing the slot in the hanger, a vertically slotted plunger casing supported at its lower end upon the lower end of the hanger and cut away for the passage of the toothed portion of the shaft, a plunger disposed within the plunger casing and having teeth engaging the toothed portion of the shaft, the lower end of the plunger being formed with a socket, a spring resting upon the lower end of the plunger casing and extending up into said socket, and a guide pin around which said spring is supported.

In testimony whereof I hereunto affix my signature in the presence of two witnesses.

PEDRO VACA.

Witnesses:
H. S. FEOROUS,
JOE RODRIGUEZ.